US 9,218,408 B2

(12) United States Patent
Mascarenhas et al.

(10) Patent No.: US 9,218,408 B2
(45) Date of Patent: Dec. 22, 2015

(54) METHOD FOR AUTOMATICALLY CREATING A DATA MART BY AGGREGATED DATA EXTRACTED FROM A BUSINESS INTELLIGENCE SERVER

(75) Inventors: Alextair Mascarenhas, Foster City, CA (US); Harvard Pan, Boston, MA (US); Arun Santhanam, Irving, TX (US); Raghuram Venkatasubramanian, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 622 days.

(21) Appl. No.: 13/100,264

(22) Filed: May 3, 2011

(65) Prior Publication Data
US 2011/0295792 A1 Dec. 1, 2011

Related U.S. Application Data

(60) Provisional application No. 61/349,136, filed on May 27, 2010.

(51) Int. Cl.
*G06F 17/30* (2006.01)

(52) U.S. Cl.
CPC .... *G06F 17/30592* (2013.01); *G06F 17/30489* (2013.01); *G06F 17/30563* (2013.01)

(58) Field of Classification Search
CPC ............... G06F 17/30592; G06F 17/30563
USPC ................................. 707/602, 607
See application file for complete search history.

(56) References Cited

U.S. PATENT DOCUMENTS

| 6,178,418 | B1 * | 1/2001 | Singer ................................. | 1/1 |
| 6,438,537 | B1 * | 8/2002 | Netz et al. ........................... | 1/1 |
| 6,477,536 | B1 * | 11/2002 | Pasumansky et al. ............... | 1/1 |
| 6,877,006 | B1 * | 4/2005 | Vasudevan ......................... | 1/1 |
| 7,444,342 | B1 | 10/2008 | Hall et al. | |

(Continued)

FOREIGN PATENT DOCUMENTS

| CN | 1384939 | 11/2002 |
| JP | 11-3354 | 1/2011 |

OTHER PUBLICATIONS

State Intellectual Property Office of the People's Republic of China, Search Report for Chinese Patent Application No. 201180026123.7, Jun. 30, 2015, 2 pages.

(Continued)

*Primary Examiner* — Boris Gorney
*Assistant Examiner* — Amanda Willis
(74) *Attorney, Agent, or Firm* — Tucker Ellis LLP

(57) ABSTRACT

Systems and methods are described for automating the creation of data marts within an enterprise. Data is maintained in a plurality of data sources that include at least a relational database and a multidimensional database. The system includes a business intelligence server that provides a virtual logical semantic model to integrate all of the plurality of data sources. The user specifies a list of levels and measures on the virtual logical semantic model. The list of levels and measures can span data from multiple data sources. The user can also specify a location in the plurality of data sources that will store the aggregate matrix. Once the list of levels and measures are specified, the business intelligence server generates a multidimensional cube to store the data for the aggregate matrix and stores the multidimensional cube in the data source location.

19 Claims, 6 Drawing Sheets

(56) References Cited

U.S. PATENT DOCUMENTS

| | | | |
|---|---|---|---|
| 2005/0246357 A1* | 11/2005 | Geary et al. | 707/100 |
| 2006/0271568 A1 | 11/2006 | Balkir et al. | |
| 2008/0027970 A1 | 1/2008 | Zhuge et al. | |
| 2010/0023496 A1 | 1/2010 | Mohan | |

OTHER PUBLICATIONS

Maruyama, SeagateHolo7, Mar. 1, 1999, 11 pages.

Japanese Patent Office, First Office Action for Japanese Patent Application No. 2013-512642, Nov. 11, 2014, 6 pages.

* cited by examiner

| QUERY | RUN TIME (secs) |
|---|---|
| select "Fact - RMW Orders"."# of Orders", Time.Month from "Sales - Sales Overview" | 5 |
| select "Fact - RMW Orders"."# of Orders", "Time"."Month", "Product"."Product Type", "Customer"."Customer Hierarchy 3" from "Sales - Sales Overview" | 17 |
| select "Facts - Financial AR Daily Activity"."Opening Group Amount", "Customer Attributes"."Customer Category" from "Financials - AR Activity" | 13 |
| select "Demand Actuals Facts"."Actual Average Ship Delay", "Time"."Quarter" from "Demand Planning" | 6 |
| select "Fact - Sales Booking Lines"."Booked List Amount", "Product Attributes"."Brand" from "Sales - Booking Lines" | 26 |
| select "Fact - Sales Booking Lines"."Total Booked Quantity", "Product Attributes"."Division" from "Sales - Booking Lines" | 8 |
| select "Fact - Opportunity Revenue"."# of Wins", "Product"."Brand" from "Sales - Sales Overview" | 0 |
| select "Fact - Opportunity Revenue"."# of Opportunities", "Time"."Year" from "Sales - Sales Overview" | 7 |
| select "Fact - Purchase Cycle Lines"."Received Quantity", "Time"."Year" from "Sourcing - Purchase Cycle Lines" | 30 |
| select "Fact - Purchase Cycle Lines"."% Received Late", "Supplier"."Supplier State" from "Sourcing - Purchase Cycle Lines" | 14 |
| select "Facts - Click Stream"."# of Visitors", "Time"."Month" from "Web Application - Click Stream" | 6 |
| select "Facts - Click Stream"."# of Visitors", "Current Web Page"."Current Web Page Function" from "Web Application - Click Stream" | 0 |

*FIGURE 3*

```
------+------ SQL Request:
select "Facts - Financial AR Activity"."Credit Limit Used %", "Time"."Year" from "Financials - AR Overview";

------------------ General Query Info:
Repository: sba, Subject Area: Siebel Business Analytics, Presentation: Financials - AR Overview ------------------ Sending query to database named Siebel Business Analytics Data Warehouse (id: <<189402>>):
select D1.c1 as c1,
    D1.c2 as c2
from
    (select sum(T395127.AR_GRP_AMT) as c1,
        T264047.PER_NAME_YEAR as c2
    from
        W_DAY_D T264047 /* Dim_W_DAY_D_Common_Date */ , IA_AR_XACTS_DAY T395127 /* Fact_IA_AR_XACTS_DAY_Posted_Transaction */
    where ( T264047.DATE_KEY = T395127.POSTED_ON_DK and T395127.POSTED_FLAG = 'Y' )
    group by T264047.PER_NAME_YEAR
    ) D1
order by c2

------------------ Sending query to database named Siebel Business Analytics Data Warehouse (id: <<189425>>):
select D2.c1 as c1,
    D2.c2 as c2
from
    (select sum(T396614.AR_GRP_AMT) as c1,
        T264047.PER_NAME_YEAR as c2
    from
        W_DAY_D T264047 /* Dim_W_DAY_D_Common_Date */ , IA_AR_XACTS_DAY T396614 /* Fact_IA_AR_XACTS_DAY_Balance_Delta */
    where ( T396614.POSTED_FLAG = 'Y' and T396614.POSTED_ON_DK between T264047.DATE_KEY and 2543348 )
    group by T264047.PER_NAME_YEAR
    ) D2
order by c2

------------------ Sending query to database named Siebel Business Analytics Data Warehouse (id: <<189344>>):
select distinct sum(case when T6584.GROUP_ACCT_NUM = 'AR' then T969.BALANCE_GRP_AMT end ) as c1
from
    IA_AR_BALANCE T969 /* Fact_IA_AR_BALANCE */ , IA_GL_ACCOUNTS T6584 /* Dim_IA_GL_ACCOUNTS */
where ( T969.GL_ACCT_KEY = T6584.GL_ACCOUNT_KEY )

------------------ Sending query to database named Siebel Business Analytics Data Warehouse (id: <<189350>>):
select distinct sum(T358342.CUST_CREDIT_LIMIT) as c1
from
    IA_CUST_ACCTS T358342 /* Fact_IA_CUST_ACCTS */

------------------ Query Status: Successful Completion

------------------ Rows 7, bytes 840 retrieved from database query id: <<189402>>
------------------ Physical query response time 14 (seconds), id <<189402>>
------------------ Rows 28, bytes 3360 retrieved from database query id: <<189425>>
------------------ Physical query response time 506 (seconds), id <<189425>>
------------------ Rows 1, bytes 16 retrieved from database query id: <<189344>>
------------------ Physical query response time 7 (seconds), id <<189344>>
------------------ Rows 1, bytes 16 retrieved from database query id: <<189350>>
------------------ Physical query response time 178 (seconds), id <<189350>>
------------------ Physical Query Summary Stats: Number of physical queries 4, Cumulative time 705, DB-connect time 0 (seconds)
------------------ Rows returned to Client 28
```

*FIGURE 4*

METHOD FOR AUTOMATICALLY CREATING A DATA MART BY AGGREGATED DATA EXTRACTED FROM A BUSINESS INTELLIGENCE SERVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business intelligence and in particular to efficiently accessing data by using aggregates.

BACKGROUND

In recent years, business intelligence tools have become increasingly utilized by large business enterprises and other organizations. Business intelligence provides current and historical views of business operations by analyzing internal, structured data and business processes of the organization. It is often used to create future models and predictions in order to support better business decision making. As such, business intelligence tools can lead to decreased costs and increased efficiency, productivity and profit margins for many companies.

Business intelligence is usually implemented as software and/or hardware tools that are used to collect and analyze data and to transform the raw data into meaningful and useful information used to enable more effective strategic, tactical, and operational insights and decision-making. As such, a typical business intelligence server relies on data that may reside in a variety of places, including but not limited to databases, repositories, content management systems, application servers and many other sources.

In a typical business intelligence server, data is collected from all (or some) of these sources and placed into a (virtual or physical) data warehouse or data mart, where it can then be modeled and analyzed before being presented to the user. The creation of such data marts can significantly improve performance. For example, data marts can store aggregate tables, which are physical tables that store aggregates of measures across multiple levels of a hierarchy. These aggregate tables can be thought of as pre-computed results, which are measures that have been aggregated (typically summed) over a set of dimensional attributes. The persistence of such aggregates can improve query performance by providing faster access to specific data than would otherwise be achieved by executing full queries to gather the underlying data. In other words, by pre-computing and storing the desired aggregates ahead of time, query response time is reduced since the server no longer needs to compute and gather all of the results upon each execution of the query.

However, many shortcomings still exist in the creation and automation of such data marts and aggregates. The task of manually creating aggregate tables is tedious, usually requiring writing complicated data definition language (DDL) and/or data manipulation language (DML) to create tables in the databases involved. Additionally, these tables need to be mapped into the repository metadata to be available for queries. This is a time consuming, and a possibly error prone process. Additionally, as the number of aggregate tables increases, taking advantage of such aggregates and putting them to good use becomes more and more difficult. In light of these inefficiencies, what is desirable is a way to automate, to the greatest extent, the creation of aggregate tables and their mappings into the metadata.

SUMMARY OF INVENTION

Systems and methods are described for building and maintaining data marts over a variety of different data sources. Aggregates are created and persisted across a plurality of different data sources that include relational databases, as well as multidimensional databases. This allows site administrators to easily build and maintain data marts over a wide variety of data sources and performance enhancing technologies, including but not limited to relational databases, multidimensional database management systems (MDBMS), Online Analytical Processing (OLAP) tools, and the like.

In the various embodiments, a business intelligence server provides a virtual semantic model that incorporates all of the various data sources of the enterprise. The user or administrator can identify a set of queries that tend to be a bottleneck and would thus benefit from aggregated data. The user can specify a list of levels and optionally a list of measures that will be used to create the aggregates. These levels and measures can span multiple data sources. In addition, a target data source can be specified, which will be used to store the generated aggregate. The business intelligence server can then create the multidimensional cube that will store the aggregated data and store the multidimensional cube into the specified target data store.

BRIEF DESCRIPTION OF THE DRAWINGS

FIG. 3 is an illustration of identifying candidates for aggregation, in accordance with various embodiments of the invention.

FIG. 4 is an alternative illustration of identifying candidates for aggregation, in accordance with various embodiments of the invention.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, systems and methods are described for automating the creation of data marts and aggregates within an enterprise. Data is maintained in a plurality of data sources that include at least a relational database and a multidimensional database. The system includes a business intelligence server that provides a virtual logical semantic model to integrate all of the plurality of data sources. The user specifies a list of levels and measures for the aggregate by using the virtual logical semantic model. The aggregate includes data from one or more of the plurality of data sources. The user can also specify a location in the plurality of data sources that will store the aggregate matrix. Once the input is received for creating the aggregate, the business intelligence server automatically creates a multidimensional cube to store the data for the aggregate and stores the multidimensional cube in the data source location designated by the user.

Figure 1:
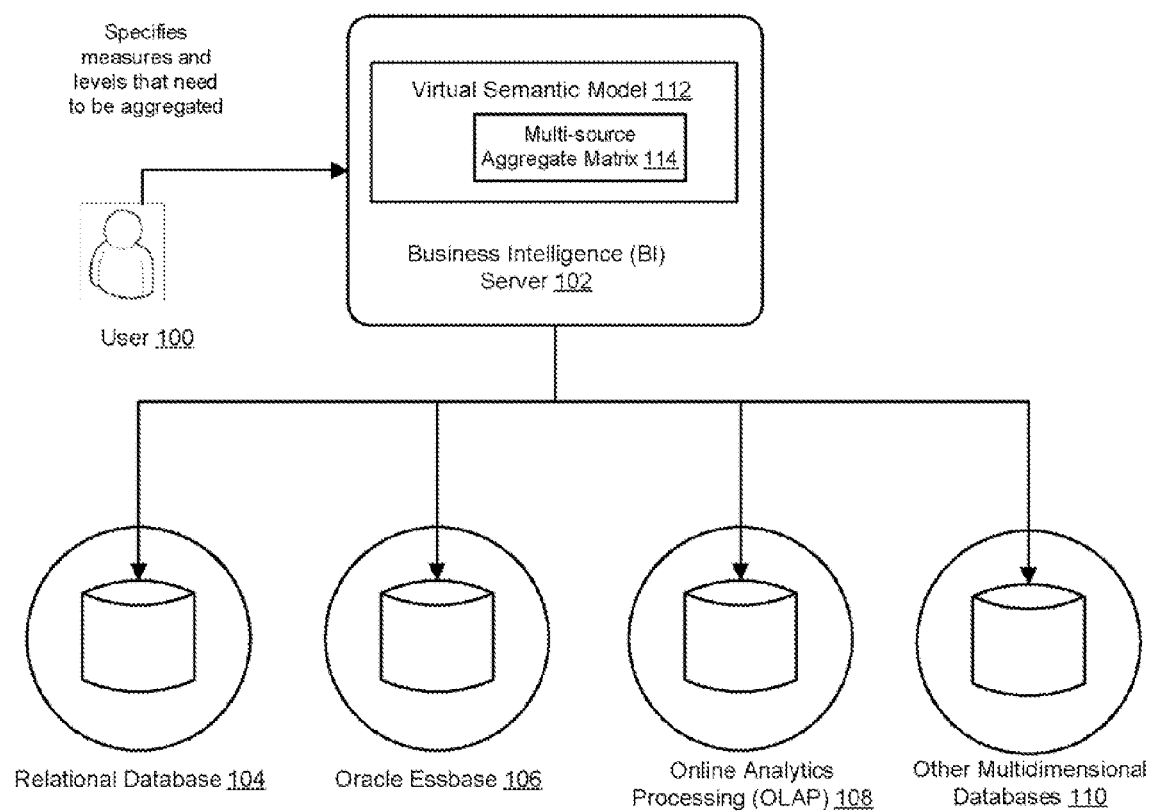
FIG. 1 is an illustration of data mart automation, in accordance with various embodiments of the invention.

FIG. 1 is an illustration of the data mart automation, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In accordance with various embodiments, the enterprise data is stored in a plurality of different physical data sources, which can include relational databases 104, multidimensional database management systems (e.g. Oracle Essbase 106), Online Analytic Processing tools (e.g. Oracle Analytic Workspace 108) and other data sources 110. In accordance with an embodiment, the business intelligence (BI) server 102 provides a foundation for defining a semantic model 112 for the data across the multiple data sources of the enterprise. This single logical model 112 can accommodate all of the data sources of the enterprise. This can be implemented by providing a presentation layer that is rendered to the user which is mapped to the physical layer that directly models the entities in the data sources. As such, the user is provided with one logical view of data and the BI server maps this view to each physical model of the respective source.

In accordance with various embodiments, the business intelligence server can employ aggregate persistence to improve access to the data in the multiple data sources. In one embodiment, a user (e.g. administrator) can specify measures and levels that need to be aggregated across the plurality of data sources. For example, the user 100 can define an aggregate matrix 114 using the virtual semantic model. This aggregate matrix can pull together information across multiple data sources. Because the levels and measures are specified using the virtual semantic model of the BI server, the fact that a particular aggregate spans multiple data sources can be made transparent to the user. In other words, BI server can take care of all appropriate data mapping and the user does not need to specify (or know) which piece of data is residing at which data source.

In accordance with an embodiment, at the time of specifying the levels and measures for the aggregate, the user an also designate a location in one of the plurality data sources where the aggregated data will be physically stored.

Once the list of levels and measures are specified using the virtual model, the BI server can automatically generate the multidimensional cube that contains the data defined in the aggregate matrix and populate the designated data source with the cube. In accordance with an embodiment, the BI server creates metadata, relational dimensions and the cube and stores the cube in the data source specified in the location.

Figure 2:
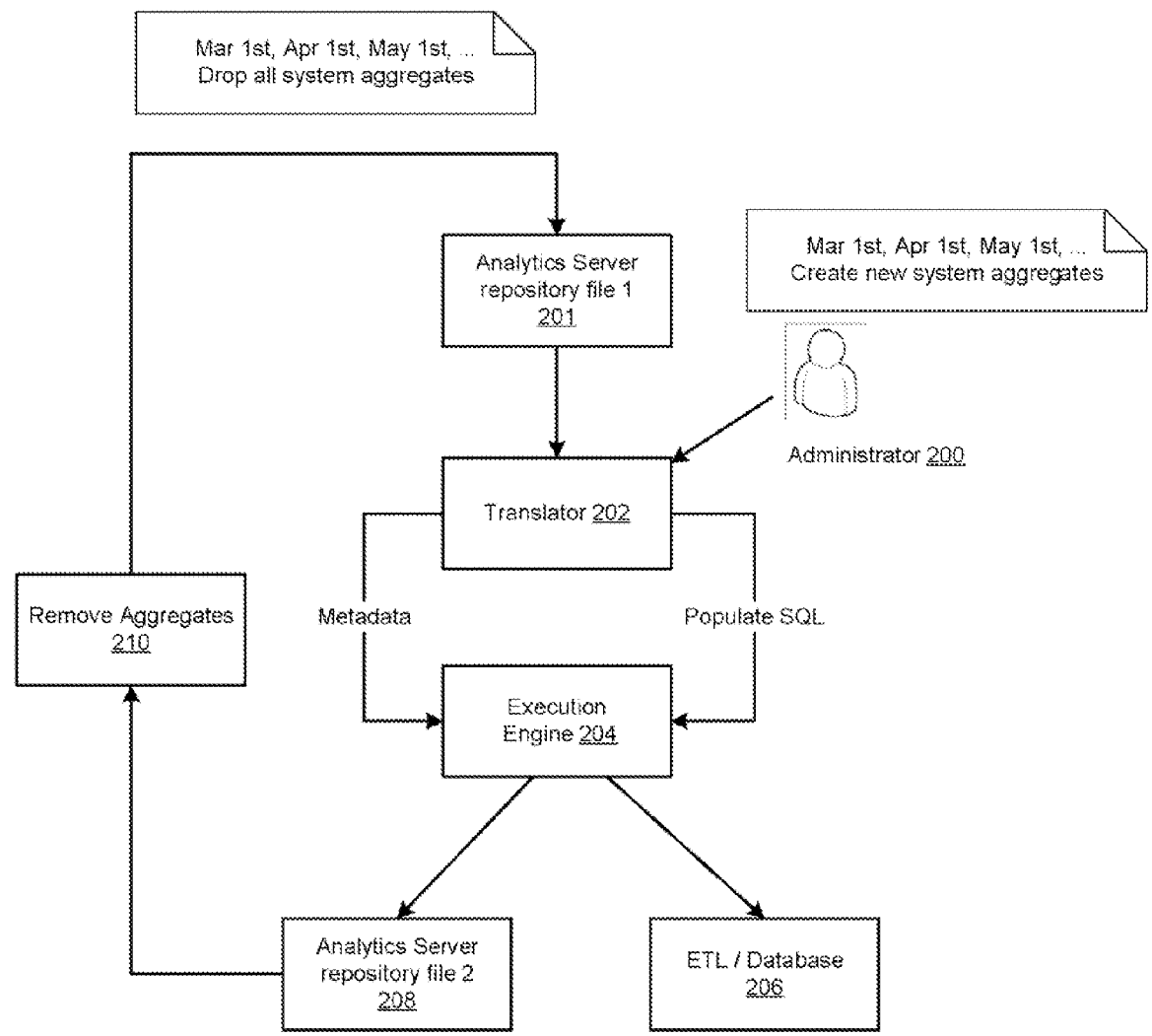
FIG. 2 illustrates a typical usage scenario of creating aggregates, in accordance with various embodiments of the invention.

FIG. 2 illustrates a typical usage scenario of creating aggregates, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, an administrator 200 of a repository logs in and issues the aggregate creation requests against a live analytics server (e.g. a business intelligence server). This process can be automated and scheduled through external means as needed (e.g. using batch files and Windows scheduler). In accordance with certain embodiments, it may be advantageous to perform this aggregate creation against a staging analytics server and tested for some time, before being moved to the production system.

In the example illustrated, the extract, transform and load (ETL) 206 process is run on the first day of every month. Assuming no metadata changes other than new aggregate addition, the repository file 208 is brought back to its original state (201) by removing the system generated aggregates 210 (the repository file contains the metadata that represents the analytical model). The administrator can then either:

a. Create the previously defined aggregates;
b. Remove the old aggregates and replace them with new ones; or
c. Append new aggregates to the existing ones.

In accordance with an embodiment, the translator component 202 receives the input from the administrator 200 and creates the appropriate metadata and submits structured query language (SQL) statements to the execution engine 204 to populate the aggregate. In accordance with an embodiment, the execution engine creates the multidimensional cube containing the aggregate and stores the aggregate in the designated data store.

In accordance with an embodiment, to create an aggregate, the business intelligence server can perform the following steps:

Create a single aggregate table (both in the physical layer of the BI server and in the database) for each level.
  This level aggregate table will contain columns at that level, and at all levels higher up in the dimension hierarchy.
  The table key is set to the level primary key.
Create a single aggregate table (BI server and database) for each fact table.

Create a single aggregate table (BI server and database) for all fact columns specified in the input request.

For the aggregate fact tables:
The aggregate columns include the columns from the primary keys in the levels specified. These are set as foreign keys (joined with the primary keys in the corresponding level table).

If the whole fact table is specified, the key columns from the fact table are not included as columns in the aggregate table.

Create foreign key relationships/joins between aggregate fact tables and level tables in the physical layer.

Populate the newly created aggregate tables in the database.

Create and add corresponding Logical Table Sources for each of the aggregate tables created.
Specify aggregation content for each Logical Table Source.

Check-in newly created metadata objects.

It should be noted that the list of steps above is provided purely for purposes of illustration and is not intended to be limiting on all of the embodiments described herein. It will be apparent to one of ordinary skill in the art that other steps can be implemented by the server to carry out the creation of the aggregate within the scope of the present disclosure.

FIG. 3 is an illustration of identifying candidates for aggregation, in accordance with various embodiments of the invention. More specifically, the example illustrates the use of usage tracking in recommending aggregates. In accordance with an embodiment, a tracking log can be used to log the analytics repository and the run times of various queries. This tracking log can then be used by the administrator to identify which queries cause a bottleneck in performance (create slower than typical response times) and potentially create aggregates for those queries.

As shown in the illustration, the highlighted query (select "Fact—Purchase Cycle Lines". "Received Quantity", "Time". "Year" from "Sourcing—Purchase Cycle Lines") is the slowest and takes about 30 seconds to run. In accordance with an embodiment, creating an aggregate for 'Received Quantity" at the "Year" level would benefit this query greatly. After creating the aggregates for this query, the run time for the query would be substantially reduced (e.g. 2 seconds).

FIG. 4 is an alternative illustration of identifying candidates for aggregation, in accordance with various embodiments of the invention. More specifically, another way of analyzing long running queries is to analyze the physical SQL statements that are generated. In this illustration, the query takes about 9 minutes (543 seconds) to run because it splits off into four separate sub-queries. The longest of these sub-queries (ID: 189425) takes 506 seconds to execute. Therefore, creating an aggregate for "AR_GRP_AMT" at the level "Year" would substantially reduce the overall query time. In accordance with an embodiment, this aggregate can be created by using a statement similar to the following:

In accordance with an embodiment, the creation of this aggregate reduces the runtime for the sub-query and therefore the total time for the query. In accordance with various embodiments, one could also aggregate the fact table for the fourth sub-query (ID: 189350) which takes 178 seconds, as well as the other sub-queries shown in FIG. 4.

Figure 5:
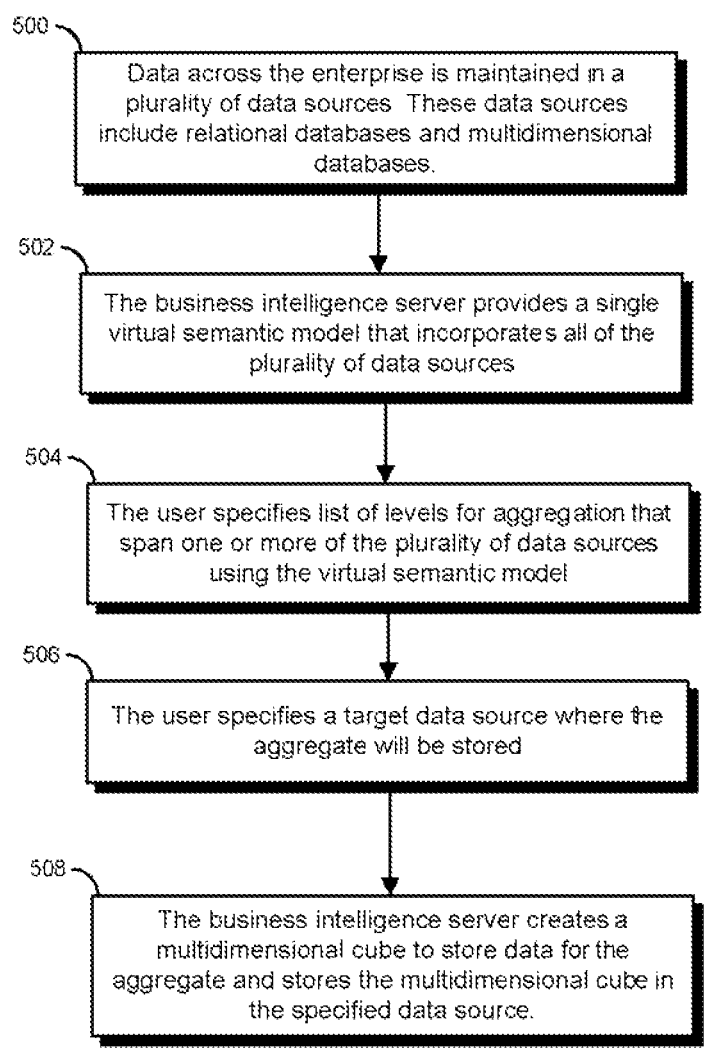
FIG. 5 is a flow chart illustration of using aggregate persistence to automate the creation of data marts, in accordance with various embodiments of the invention.

FIG. 5 is a flow chart illustration of using aggregate persistence to automate the creation of data marts, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, enterprises typically maintain data in a wide variety of different data sources. These data sources can include relational databases, multidimensional database management systems (MDBMS), Online Analytical Processing (OLAP) tools, and the like. In accordance with an embodiment, the BI server provides a single virtual semantic model that incorporates all of the plurality of data sources (step 502).

In step 504, the user specifies list of levels for aggregation that span one or more of the plurality of data sources using the virtual semantic model. Optionally, the user can also provide a list of measures. In addition, the user specifies a target data source where the aggregate will be stored (step 506). In accordance with an embodiment, this designated target data store is one of the plurality of data sources.

In step 508, the business intelligence server creates a multidimensional cube to store data for the aggregate and stores the multidimensional cube in the specified data source. In accordance with an embodiment, this can be performed by creating the metadata, physical tables in the target store by using the application programming interfaces (APIs) of the data store or by generating the appropriate SQL statements to execute against the data store.

Figure 6:
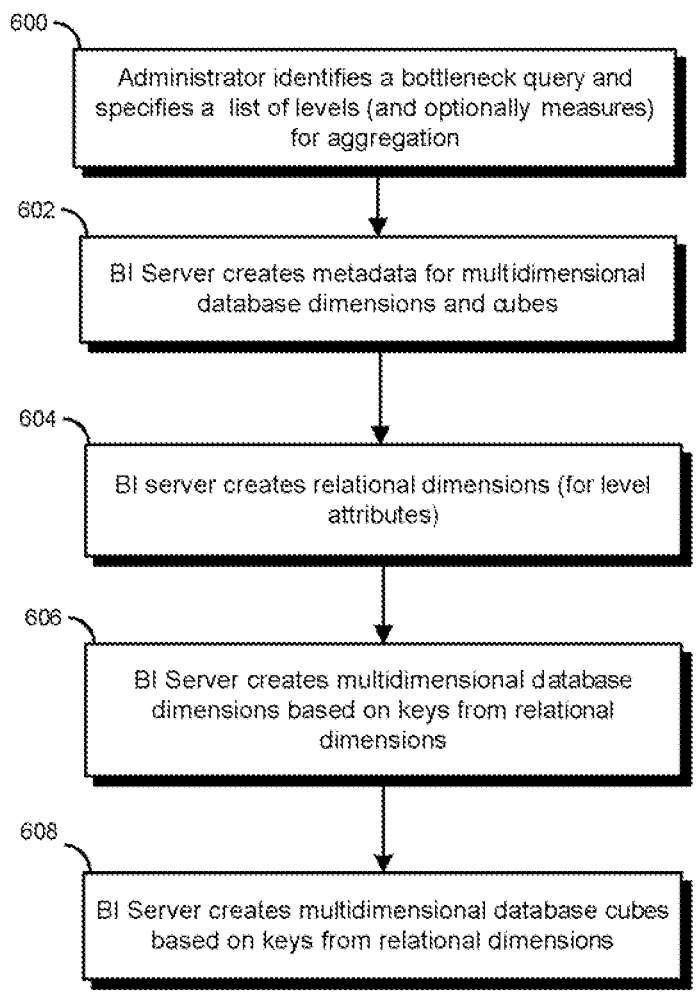
FIG. 6 is a flow hart illustration of using aggregate persistence to automate the creation of data marts, in accordance with various embodiments of the invention.

FIG. 6 is a flow hart illustration of using aggregate persistence to automate the creation of data marts, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 600, the user first specifies the measures and levels for aggregation. In one embodiment, this is per-

```
create aggregates
    "am_ag_Fact_Fins_AR"
        for "Siebel Business Analytics"."Fact - Fins (Internal) AR
Balance Delta"("Debit Account Amount","Credit Account Amount","Debit
Local Amount","Credit Local Amount","AR Local Amount","Debit Group
Amount","Credit Group Amount","AR Group Amount","AR Account Amount")
    at levels ("Siebel Business Analytics"."Date"."Year")
    using connection pool "Siebel Business Analytics Data
Warehouse"."Siebel Data Warehouse Connection Pool"
    in "Siebel Business Analytics Data Warehouse";
``` formed using the virtual model on the BI server. In step 602, the BI server creates the metadata for the dimensions and cube of the underlying multidimensional database. Next in step 604, the BI server creates relational dimensions for level attributes. Once this is done, the BI server can create the dimensions for the underlying data source (e.g. Essbase) based on the keys from relational dimensions, as shown in step 606. In step 608, the BI server then creates the multidimensional cubes based on the keys from relational dimensions and stores the cube(s) in the designated target data source.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A method for creating a data mart in a business intelligence server environment, said method comprising:
    maintaining data in a plurality of data sources, said data sources including at least a relational database and a multidimensional database;
    providing, on a business intelligence server, a virtual semantic model, wherein the virtual semantic model is a presentation layer to a user and is logically mapped to a plurality of physical models, each said physical model representing entities in a said data source;
    receiving, via the virtual semantic model from the user, a plurality of levels for aggregating data that span two or more of the plurality of data sources and a selection of a said data source for storing aggregated data, wherein said levels are identified by analyzing runtimes of queries on the two or more said data sources, wherein at least one said query reduces runtimes thereof by aggregating the data at said levels;
    creating an aggregate matrix that includes said levels, wherein the aggregate matrix is operable to perform data aggregation only at said levels by
        creating for each said level, in the said data source, a single aggregate table that contains columns at the each said level and at higher levels in a dimension hierarchy, and
        creating for each fact table a single aggregate table that includes columns corresponding to primary keys at the each said level;
    creating, by the business intelligence server, a multidimensional cube that contains the aggregated data in the aggregate tables and storing the multidimensional cube in the said data source.

2. The method of claim 1, further comprising:
creating, by the business intelligence server, a set of metadata for dimensions and cubes of the said data source.

3. The method of claim 1, further comprising:
creating, by the business intelligence server, a set of relational dimensions for level attributes.

4. The method of claim 3, further comprising:
creating, by the business intelligence server, a set of dimensions for the said data source based on keys from the relational dimensions.

5. The method of claim 3, further comprising:
creating the multidimensional cube based on keys from the relational dimensions.

6. The method of claim 1, wherein the plurality of data sources further include at least one of an Oracle database, an Oracle Essbase database and an Oracle Analytic Workspace.

7. The method of claim 1, further comprising:
invoking, by the business intelligence server, a Java application programming interface (API) of the said data source in order to configure metadata therein.

8. The method of claim 1, wherein a set of dimensions is stored within the cube for the aggregate matrix.

9. The method of claim 1, further comprising:
creating complex joins between the cube and the aggregate matrix within a physical metadata layer in the business intelligence server.

10. A system for creating a data mart in a business intelligence server environment on a computer including one or more microprocessors, said system comprising:
    a plurality of data sources that maintain data within an enterprise, said plurality of data sources including at least a relational database and a multidimensional database;
    a business intelligence server, executing on the computer, that provides a virtual logical semantic model, wherein the virtual logical semantic model is a presentation layer to a user and is logically mapped to a plurality of physical models, each said physical model representing entities in a said data source, wherein the business intelligence server receives a specification of a list of levels and a selection of a said data source for storing aggregated data by using the virtual logical semantic model, wherein the plurality of levels spans data from at least two of said plurality of data sources, wherein said levels are identified by analyzing runtimes of queries on the two or more said data sources, wherein at least one said query reduces runtimes thereof by aggregating the data at said levels;

an aggregate matrix, created with the virtual semantic model, which includes the plurality of levels, wherein the aggregate matrix is operable to perform data aggregation only at said levels by creating for each said level, in the said data source, a single aggregate table that contains columns at the each said level and at higher levels in a dimension hierarchy, and creating for each fact table a single aggregate table that includes columns corresponding to primary keys at the each said level;

wherein the business intelligence server generates a multidimensional cube that contains the aggregated data in the aggregate tables, and stores the multidimensional cube in the said data source.

11. The system of claim 10, wherein the business intelligence server creates a set of metadata for dimensions and cubes of the said data source.

12. The system of claim 10, wherein the business intelligence server creates a set of relational dimensions for level attributes.

13. The system of claim 12, wherein the business intelligence server creates a set of dimensions for the said data source based on keys from the relational dimensions.

14. The system of claim 12, wherein the business intelligence server creates the multidimensional cube based on keys from the relational dimensions.

15. The system of claim 10, wherein the plurality of data sources further include at least one of an Oracle database, an Oracle Essbase database and an Oracle Analytic Workspace.

16. The system of claim 10, wherein the business intelligence server invokes a Java application programming interface (API) of the said data source in order to configure metadata therein.

17. The system of claim 10, wherein a set of dimensions is stored within the cube for the aggregate matrix.

18. The system of claim 10, wherein the business intelligence server creates complex joins between the cube and the aggregate matrix within a physical metadata layer in the business intelligence server.

19. A non-transitory computer-readable storage medium storing one or more sequences of instructions for creating data marts in a business intelligence server environment, which instructions, when executed by one or more processors, cause the one or more processors to carry out the steps comprising:

maintaining data in a plurality of data sources, said data sources including at least a relational database and a multidimensional database;

providing, on a business intelligence server, a virtual semantic model, wherein the virtual semantic model is a presentation layer to a user and is logically mapped to a plurality of physical models, each said physical model representing entities in a said data source, wherein at least one said query reduces runtimes thereof by aggregating the data at said levels;

receiving, via the virtual semantic model from the user, a plurality of levels for aggregating data that span two or more of the plurality of data sources and a selection of a said data source for storing aggregated data, wherein said levels are identified by analyzing runtimes of queries on the two or more said data sources;

creating an aggregate matrix that includes said levels, wherein the aggregate matrix is operable to perform data aggregation only at said levels by creating for each said level, in the said data source, a single aggregate table that contains columns at the each said level and at higher levels in a dimension hierarchy, and creating for each fact table a single aggregate table that includes columns corresponding to primary keys at the each said level;

creating, by the business intelligence server, a multidimensional cube that contains the aggregated data in the aggregate tables and storing the multidimensional cube in the said data source.

* * * * *